(12) United States Patent
Belz et al.

(10) Patent No.: US 7,675,554 B2
(45) Date of Patent: Mar. 9, 2010

(54) METHODS AND SYSTEMS FOR MANAGING BRAGBOOK IMAGES

(75) Inventors: Steven M. Belz, Pittsford, NY (US);
Mark S. Cook, Ashburn, VA (US);
Robert Wall, Spencerport, NY (US);
Pierre Schaeffer, Chevy Chase, MD (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/352,865

(22) Filed: Jan. 13, 2009

(65) Prior Publication Data

US 2009/0123091 A1 May 14, 2009

Related U.S. Application Data

(62) Division of application No. 10/948,070, filed on Sep. 23, 2004, now Pat. No. 7,508,425.

(60) Provisional application No. 60/532,106, filed on Dec. 22, 2003.

(51) Int. Cl.
*H04N 5/76* (2006.01)
(52) U.S. Cl. .................................................. 348/231.2
(58) Field of Classification Search ............... 348/231.2
See application file for complete search history.

(56) References Cited

U.S. PATENT DOCUMENTS 5,986,837 A * 11/1999 Kubo ........................... 360/60
6,389,222 B1 * 5/2002 Ando et al. .................... 386/95
6,549,232 B1 * 4/2003 Taniguchi et al. ......... 348/231.99
7,116,361 B2 * 10/2006 Baron ....................... 348/231.1
7,184,081 B1 * 2/2007 Miyake ..................... 348/231.2
7,295,230 B2 * 11/2007 Takahashi et al. .......... 348/231.1
2003/0151767 A1 * 8/2003 Habuta et al. ............... 358/1.15
2004/0032513 A1 * 2/2004 Kokubun .................. 348/231.7
2006/0238619 A1 * 10/2006 Takahashi ................. 348/207.1

* cited by examiner

*Primary Examiner*—James M Hannett
(74) *Attorney, Agent, or Firm*—Stephen H. Shaw

(57) ABSTRACT

A device, system, method and software product for storing, maintaining, sharing and displaying of digital images in a common designated collection on at least one portable storage and display device. The device has a first memory section designated for storing images and a second memory section for storing digital images of the designated collection. The second memory section has a protected mode that prevents the digital images in the second memory section from being deleted or overwritten. When the protected mode of the second section is disabled, the device will overwrite the digital images of the second memory section with newly captured digital images. These digital images are restored to the second memory section when the digital display and storage device is in communication link with a database that has information for restoring overwritten digital images after newly obtained images in the second memory have been removed from the device.

27 Claims, 4 Drawing Sheets

METHODS AND SYSTEMS FOR MANAGING BRAGBOOK IMAGES

CROSS-REFERENCE TO RELATED APPLICATIONS

This is divisional of U.S. Ser. No. 10/948,070 filed Sep. 23, 2004 now U.S. Pat. No. 7,508,425 which is a 111A Patent Application which claims priority of U.S. Provisional Application 60/532,106 filed Dec. 22, 2003.

FIELD OF THE INVENTION

The present invention relates to capturing, transferring, storing, organizing and processing images for display and reuse.

BACKGROUND OF THE INVENTION

There are numerous digital devices that are capable of capturing and/or storing digital images. Examples of such devices are digital cameras, camera phones, and PDAs (personal digital assistants). The captured images are typically viewed on displays that are part of the device and are stored in internal memory or additional memory provided by a removable memory card. With respect to digital image capture devices, as the internal or card memory fills with digital image files, in order to capture additional photos (images), the user needs to obtain a new memory card or copy the image files to an image provider or another device such as a PC or storage device. A problem with this process is that the digital photos once transferred are no longer easily accessible to the user. The user needs to have access to the PC or the Internet in order to reuse or display captured photos. Carrying separate memory cards or storage devices offer some improvement, however, managing and organizing images for mobility can be a time consuming and laborious process.

One of the objects of the present invention is to provide methods and systems for making digital photos easily accessible to the user. The methods and systems described also offer several improvements in image organization and digital photo storage optimization. Another object of the present invention is to provide a system which enables camera users to have all their favorite pictures with them wherever they bring their camera or other image capture or portable storage device. The user identifies his/her favorite pictures via a camera control or via a PC with appropriate software. The identified favorite images are sized as needed and transferred to an identified restricted internal memory location of a portable digital image capture or storage device. Stored favorite digital images may be shared by visual display or by transfer via email, and via printing (printer dock, Pictbridge or local printer, kiosk, online). The system offers a 'free up memory' mode in digital image capture devices which will allow users to temporarily delete their favorite stored image from internal memory. This allows the user to capture additional new images in the freed up identified restricted internal memory and after the next time the device is linked to a host PC, the Bragbook is reinstated in the identified restricted internal memory location per the user's rule set.

SUMMARY OF THE INVENTION

In accordance with one aspect of the present invention there is provided a digital display and storage device having memory for storing and displaying of digital images, said memory having a first section designated for storing images that are obtained by said digital display and storage device and a second memory section for storing digital images, said second memory section having a protected mode that prevents said digital images in said second memory section from being deleted or overwritten until the user of said digital display and storage device disables the protected mode, when said protected mode of said second section is disabled then said digital display and storage device will overwrite said digital images said second memory section with said newly captured digital images, said digital images in said second memory section that were overwritten are restored to said second memory section when said digital display and storage device is in communication link with a database that has information for restoring said digital images that have been overwritten and after said newly obtained images in said second memory have been removed from said digital display and storage device.

In accordance with another aspect of the present invention there is provided a digital display and storage device having memory for storing digital images, said memory having a first section designated for storing images obtained by said digital display and storage device at a first resolution and a second memory section for storing designated digital images at a second resolution which is less than said first resolution, said second section having a protected mode that prevents said digital images in said second memory section from being deleted and/or overwritten until the user of said digital display and storage device disables the protected mode, when said protected mode of said second section is disabled then obtained digital images of said digital display and storage device will overwrite said digital images in said second memory section with said newly obtained digital images, said designated digital images in said second section being controlled by instructions on a host computer that can communicate with said digital display and storage device.

In accordance with another aspect of the present invention there is provided a system for managing digital images that have been designated for placement in an identified designated collection, comprising:

a computer capable of communicating with said digital display and storage device, said computer having said database containing digital images that have been designated for placement in an identified collection thereon, that allows for restoration of said digital images in said second memory section.

at least one digital display and storage device having memory for storing of digital images, said memory having a first section designated for storing digital images that have been obtained by said digital display and storage device and a second memory section for storing digital images that correspond to said images in said identified designated collection on said computer, said second memory section having a protected mode that prevents said digital images in said second memory section from being deleted until the user of said digital display and storage device disables the protected mode, when said protected mode of said second section is disabled then said digital display and storage device can overwrite said digital images in said second memory section with newly obtained digital images, said second memory being restored to correspond to said digital images in said identified collection on said computer when said display and storage device is in a communication link with a database after said newly obtained digital images in said second memory have been removed.

In accordance with yet another aspect of the present invention there is provided a software product for use in controlling a digital display and storage device, said digital display and storage device having a memory for storing of digital images and communication capabilities for communicating with other devices and a computer program when loaded on said digital display and storage device will cause the display and storage device to perform the steps of:

allowing storage of obtained digital images in a first memory section of said memory;

allowing storage of designated digital images in a second memory section of said memory, said second memory section having a protected mode that prevents said digital images in said second memory section from being deleted;

allowing a user of said digital display and storage device to disable the protected mode such that when said protected mode of said second memory section is disabled said digital display and storage device can overwrite said digital images in said second memory section with said newly obtained digital images; and restoring of said digital images in said second memory section that were overwritten to said second memory section when said camera is in communication with a database that has information for restoring said digital images that have been overwritten.

In accordance with another aspect of the present invention there is provided a software program such that when said software program is loaded onto a computer, it will cause the computer to perform the steps of:

control the storage of digital images in a designated collection in said computer and a corresponding collection in at least one digital display and storage device, said digital display and storage device having memory for storing of digital images and communication capabilities for communicating with said computer, said memory having a first section for storage of digital images obtained by said display and storage device and a second memory section for long term storage of designated digital images, said program controlling what digital images are placed in said second memory section of said at least one display and storage device, said at least one display and storage device having a protected mode that prevents said digital images in said second memory section from being deleted, and allows a user of said digital display and storage device to disable the protected mode such that when said protected mode of said second memory section is disabled said digital display and storage device will overwrite said digital images in said second memory section with said obtained digital images; and restoring of said digital images in said designated collection in second memory section that were overwritten when said display and storage device is in communication with computer.

In accordance with yet another aspect of the present invention there is provided a method for maintaining a designated collection of digital images among a plurality of associated devices, comprising the steps of:

a. maintaining a control designation collection of digital images in a first device for controlling what is maintained in said control designation collection and at a designated resolution which is equal to or less than the highest resolution of said image obtained by said first device, said first device having the ability to add and/or delete digital images from said control designation collection, said first device capable of establishing a communication link with at least one associated display and storage device and controlling a corresponding collection of digital images at a second designated resolution in said at least one display and storage device that corresponds to said control designation collection, each of said at least one associated storage and display device having the ability to obtain digital images and identifying if the newly obtained images are to be added to said control designation collection, said corresponding collection of digital images is located in a protected memory location that can only be overwritten by a specific action taken by a user of said at least one digital display and storage device;

b. establishing a communication link between said first device and said at least one display and storage device; and c. automatically updating said control designation collection in said first device when said first device is in communication link with said at least one associated device and updating said corresponding collection on said at least one associated storage and display device.

In accordance with another aspect of the present invention there is provided a digital camera having memory for storing and displaying of digital images, said memory having a first section designated for storing images that are obtained by said digital camera and a second memory section for storing digital images, said second memory section having a protected mode that prevents said digital images in said second memory section from being deleted or overwritten until the user of said digital camera disables the protected mode, when said protected mode of said second section is disabled then said digital camera will overwrite said digital images in said second memory section with said newly captured digital images, said digital images in said second memory section that were overwritten are restored to said second memory section when said digital camera is in communication link with a database that has information for restoring said digital images that have been overwritten and after said newly captured images in said second memory have been removed from said digital camera.

In accordance with still another aspect of the present invention there is provided a digital camera and a storage device wherein the host device has a unique identification where the higher resolution is stored and said unique identification is used to permit authorized communication between said digital display and storage device and said host device.

In accordance with another aspect of the present invention there is provided a digital camera having memory for storing digital images, said memory having a first section designated for storing images captured by said digital camera at a first resolution and a second memory section for storing designated digital images at a second resolution which is less than said first resolution, said second section having a protected mode that prevents said digital images in said second memory section from being deleted and/or overwritten until the user of said digital camera disables the protected mode, when said protected mode of said second section is disabled captured digital images of said digital camera will overwrite said digital images in said second memory section with said newly captured digital images, said designated digital images in said second section being controlled by instructions on a host computer that can communicate with said digital camera.

In accordance with yet another aspect of the present invention there is provided a system for managing digital images that have been designated for placement in an identified designated collection, comprising:

a computer capable of communicating with said digital camera, said computer having said database containing digital images that have been designated for placement in an identified collection thereon, that allows for restoration of said digital images in said second memory section.

at least one digital camera having memory for storing of digital images, said memory having a first section designated for storing digital images that have been obtained by said digital camera and a second memory section for storing digital images that correspond to said images in said identified designated collection on said computer, said second memory section having a protected mode that prevents said digital images in said second memory section from being deleted until the user of said digital camera disables the protected mode, when said protected mode of said second section is disabled then said digital camera can overwrite said digital images in said second memory section with newly obtained digital images, said second memory being restored to correspond to said digital images in said identified collection on said computer when said camera is in a communication link with a database after said newly obtained digital images in said second memory have been removed.

In accordance with another aspect of the present invention there is provided a software product for use in controlling a digital camera, said digital camera having a memory for storing of digital images and communication capabilities for communicating with other devices and a computer program when loaded on said digital camera will cause the camera to perform the steps of:

allowing storage of captured digital images in a first memory section of said memory;

allowing storage of designated digital images in a second memory section of said memory, said second memory section having a protected mode that prevents said digital images in said second memory section from being deleted;

allowing a user of said digital camera to disable the protected mode such that when said protected mode of said second memory section is disabled said digital camera can overwrite said digital images in said second memory section with said newly obtained digital images; and restoring of said digital images in said second memory section that were overwritten to said second memory section when said camera is in communication with a database that has information for restoring said digital images that have been overwritten.

In accordance with yet another aspect of the present invention there is provided a software program such that when said software program is loaded onto a computer, it will cause the computer to perform the steps of:

control the storage of digital images in a designated collection in said computer and a corresponding collection in at least one digital camera, said digital camera having memory for storing of digital images and communication capabilities for communicating with said computer, said memory having a first section for storage of digital images obtained by said camera and a second memory section for long term storage of designated digital images, said program controlling what digital images are placed in said second memory section of said at least one camera, said at least one camera having a protected mode that prevents said digital images in said second memory section from being deleted, and allows a user of said digital camera to disable the protected mode such that when said protected mode of said second memory section is disabled said digital camera will overwrite said digital images in said second memory section with said obtained digital images; and restoring of said digital images in said designated collection in second memory section that were overwritten when said camera is in communication with computer.

In accordance with another aspect of the present invention there is provided a method for maintaining a designated collection of digital images among a plurality of devices comprising the steps of:

a. maintaining a control designation collection of digital images in a first device for controlling what is maintained in said designated collection and at a designated resolution which is equal to or less than the highest resolution of said image obtained by said first device, said first device having the ability to add and/or delete digital images from said control designation collection, said first device capable of establishing a communication link with at least one camera and controlling a corresponding collection of digital images at said designated resolution in said at least one camera such that corresponds to said designated collection, each of said at least one storage and display device having the ability to obtain digital images and identifying if the newly obtained images are to be added to said control designated collection, said corresponding collection is located in a protected memory location that can only be overwritten by a specific action taken by a user of said at least one digital camera;

b. establishing a communication link between said first device and said at least one camera; and c. automatically updating said control designated collection in said first device when said first device is in communication link with said at least one device and updating said corresponding collection on said at least one storage and display device.

In accordance with yet another aspect of the present invention there is provided a method for maintaining a designated collection of digital images among a plurality of associated devices and for ordering image products, comprising the steps of:

a. maintaining a control designation collection of digital images in a first device for controlling what is maintained in said control designation collection and at a designated resolution which is equal to or less than the highest resolution of said image obtained by said first device, said first device having the ability to add and/or delete digital images from said control designation collection, said first device capable of establishing a communication link with at least one associated display and storage device and controlling a corresponding collection of digital images at a second designated resolution in said at least one display and storage device that corresponds to said control designation collection, each of said at least one storage and display device having the ability to obtain digital images and identifying if the newly obtained images are to be added to said control designated collection, said corresponding collection is located in a protected memory location that can only be overwritten by a specific action taken by a user of said at least one digital display and storage device, said device having selection inputs for ordering of an image product designating one of said digital images in said corresponding collection;

b. establishing a communication link between said first device and said at least one display and storage device; and c. automatically providing said image product wherein the high resolution image of said designated image in said control designation collection in said first device is used to produce said image product.

In accordance with still another aspect of the present invention there is provided a digital display and storage device having memory for storing digital images, said memory having a first section designated for storing images obtained by said digital display and storage device at a first resolution and a second memory section for storing designated digital images at a second resolution, said second section having a protected mode that prevents said digital images in said second memory section from being deleted and/or overwritten until the user of said digital display and storage device disables the protected mode, when said protected mode of said second section is disabled then obtained digital images of said digital display and storage device will overwrite said digital images in said second memory section with said newly obtained digital images, said designated digital images in said second section being controlled by instructions on a host computer than can communicate with said digital display and storage device.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

For the purposes of the present invention a "Bragbook" is a designated collection of identified favorite digital images stored in memory on a computer or on a device that users can take with them anywhere in order to view and/or share and relive their favorite memories. Favorite digital images may represent any appropriated designation of images by user, for example, but not limited to an individual's most recent events or occasions or their most treasured or special moments. Bragbook is preferably designed for long term storage of favorite images that will enable users to share a Lifetime of Pictures at anytime, anywhere.

Figure 1:
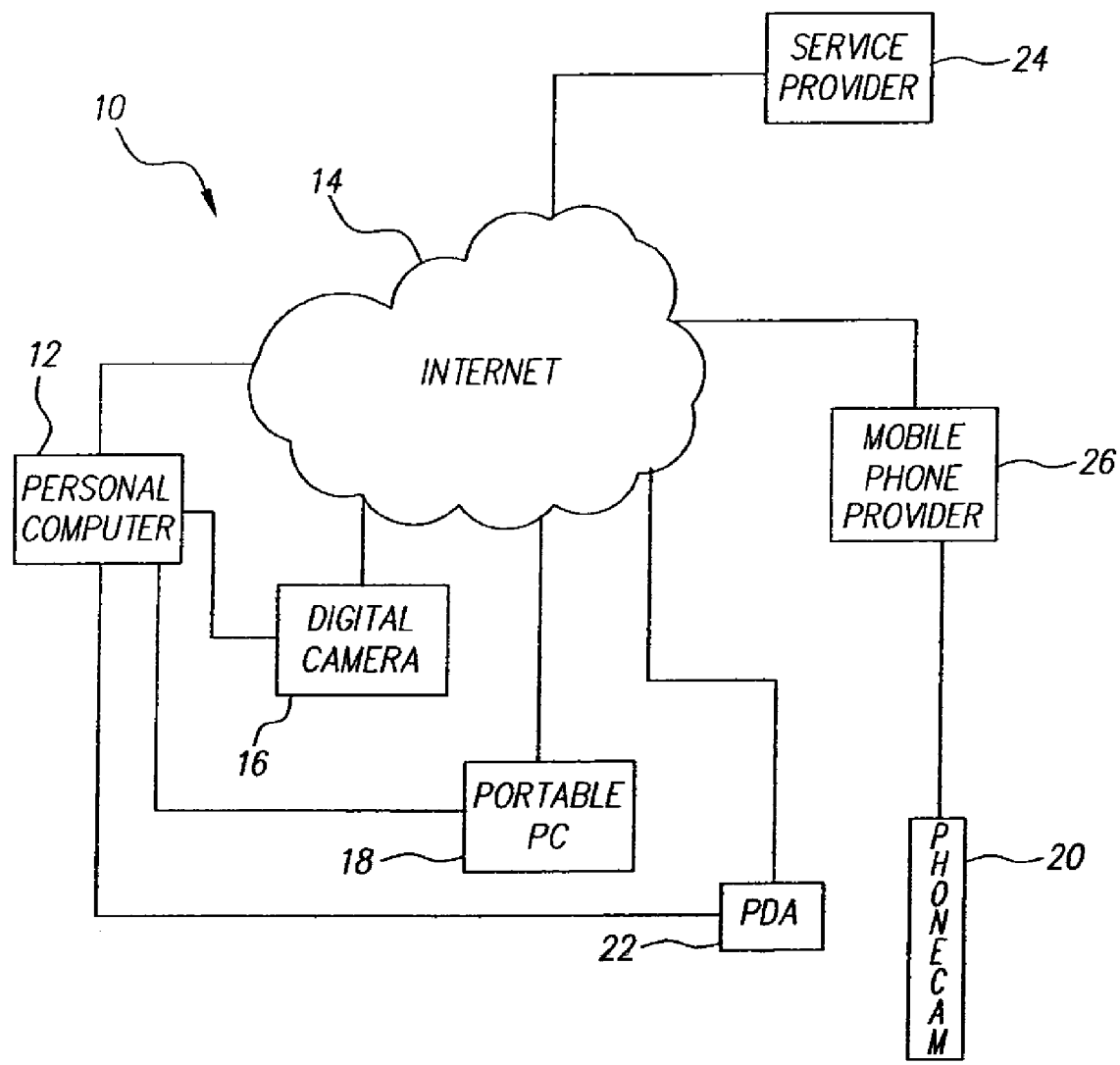
FIG. 1 is a schematic diagram of a system for operating in accordance with the present invention.

Referring to FIG. 1, there is illustrated a system 10 made in accordance with the present invention showing the major components and connectivity associated with the various Bragbook setup and various operational scenarios. The system 10 includes a computer 12 used to store images, which in one embodiment is used to create a Bragbook using an appropriate software application. An example of a suitable software for creating a Bragbook is the EasyShare software sold by Eastman Kodak Company. The system 10 also includes a communication network 14 for allowing the computer 10 to communicate with various other devices that are set with their own respective Bragbook. The various Bragbooks on the various devices are designed to have certain identified images in common as is later described herein. In the embodiment illustrated the communication network 14 comprises the Internet. The communication network 14 provides a means to send and receive data and digital image files between the various system image capture and storage components 16, 18, 20 and 22. In the embodiment illustrated component 16 is a digital camera, component 18 is a portable PC, component 20 is a phone cam and component 22 is a personal digital assistant (PDA). The system 10 may also include a service provider 24 such as Ofoto, for providing image sharing, storage and printing services and a mobile phone provider for providing telephone and data services to the phone cam 20 and other wireless portable devices. Devices such as digital cameras 16, portable computers 18, Personal Digital Assistants (PDAs) 22 and phone cams 20 provide for image capture, transfer, storage and/or display functions.

Figure 2:
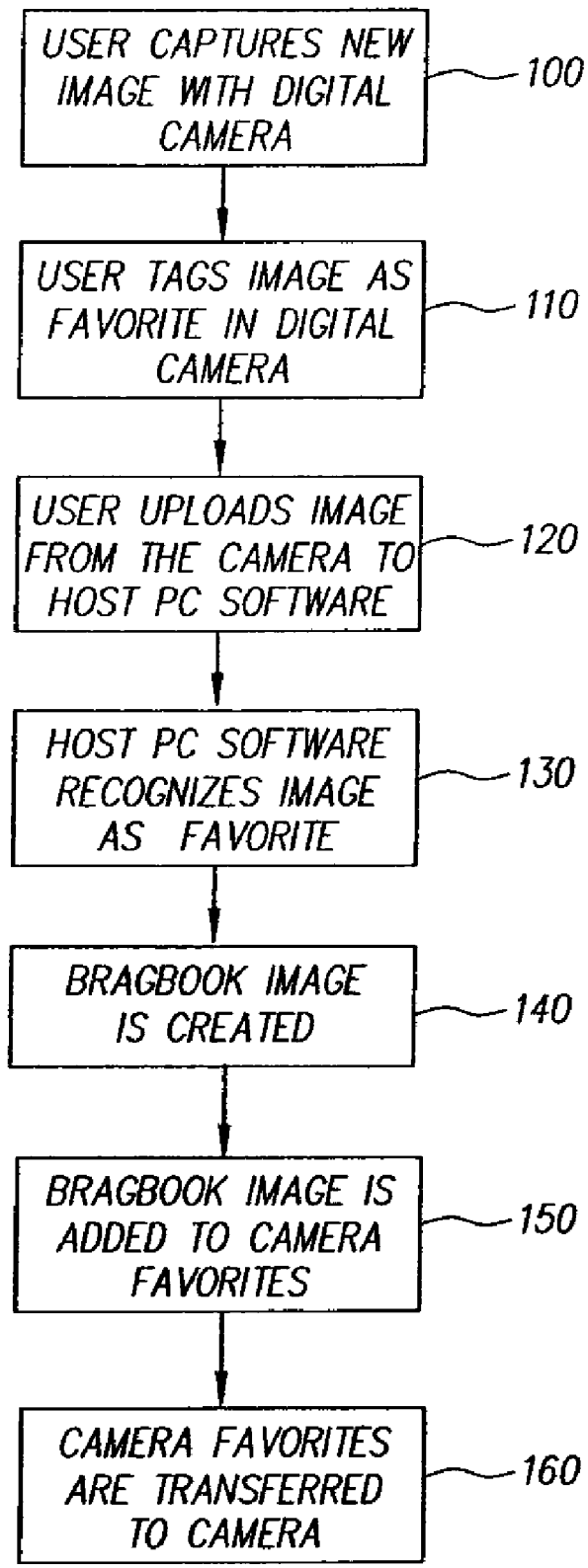
FIG. 2 is a flow chart illustrating the high level workflow for identifying favorite digital image for placement in an identified restricted memory location in a portable image storage device.

FIG. 2 describes a process for creating a Bragbook image for one mode of operation from the initial step 100 of a user capturing a digital image with a digital image capture device, such as digital camera 16. In addition, rules may be set up as to the extent that images may be automatically transferred. Using the device interface on digital camera 16, users identify images as a Favorite at step 110. At the next step 120 images (both favorite tagged and other images) are transferred from digital camera 16 to host computer 12 where the Favorite tag will persist with images that have been identified as such at step 130. However, in order to send images automatically into the various Bragbooks in each of the various associated devices, there must be a pre-authorization and pre-identification that such communication can occur. The serial number and/or other information contained in software in each device may be used to identify a specific associated device that are permitted to be in communication link with each other and for the transfer of images. This transfer is typically accomplished either by hard wire connection that uses an input port of computer 12, such as the USB port, or by wireless connect such as WIFI or Bluetooth technology. Computer 12 has installed thereon a software program for setting of the pre-identification and pre-authorization for allowing communication and transfer of images between various devices. The software, such as the Easyshare software, also manages the images of the Bragbook on computer 12 and the transfer in and/or out of the Bragbook to the various associated devices. The software is designed such that the user can set rules upon which images will be maintained in the Bragbook on computer 12 and with associated devices that have been identified for transfer of images into and out of the associated devices. It is to be understood that software on the various associated devices may each have their own software for identifying favorite images to be placed into its respective Bragbook and rules for managing these images. The software on computer 12 creates a controlling Bragbook that controls what images are to be in the Bragbook and that are to be shared with various associated devices and placed into their respective Bragbooks. Thus the Bragbook on host computer 12 will be considered the controlling computer upon which the associated device(s) rely on for controlling what is maintained in Bragbooks. The resolution image in the controlling Bragbook is obtained from the captured full resolution digital image that has been identified as favorites at step 140 and recently transferred host computer 12. The resolution of the images in the Bragbooks is selected so as to provide a good quality 4×6 hardcopy print, HDTV, DVD, Full Screen Monitor Display, and other digital standards but the overall file size is still small enough for expedient wireless transfer. Preferably the resolution of the images in the Bragbook is typically set to about 1024×768. If the originally obtained image has a full resolution that is less than the Bragbook resolution, then the image will not be up-sampled (interpolated), but will remain at the full resolution in the Bragbook.

The created Bragbook resolution image is stored in the collection associated with the camera (or other associated devices) on the host computer 12. After the new favorites have been added to the Bragbook collection on the host computer 12, it is transferred back to the camera, or other associated device 16 at the next time the two devices are in a communication link.

Figure 3:
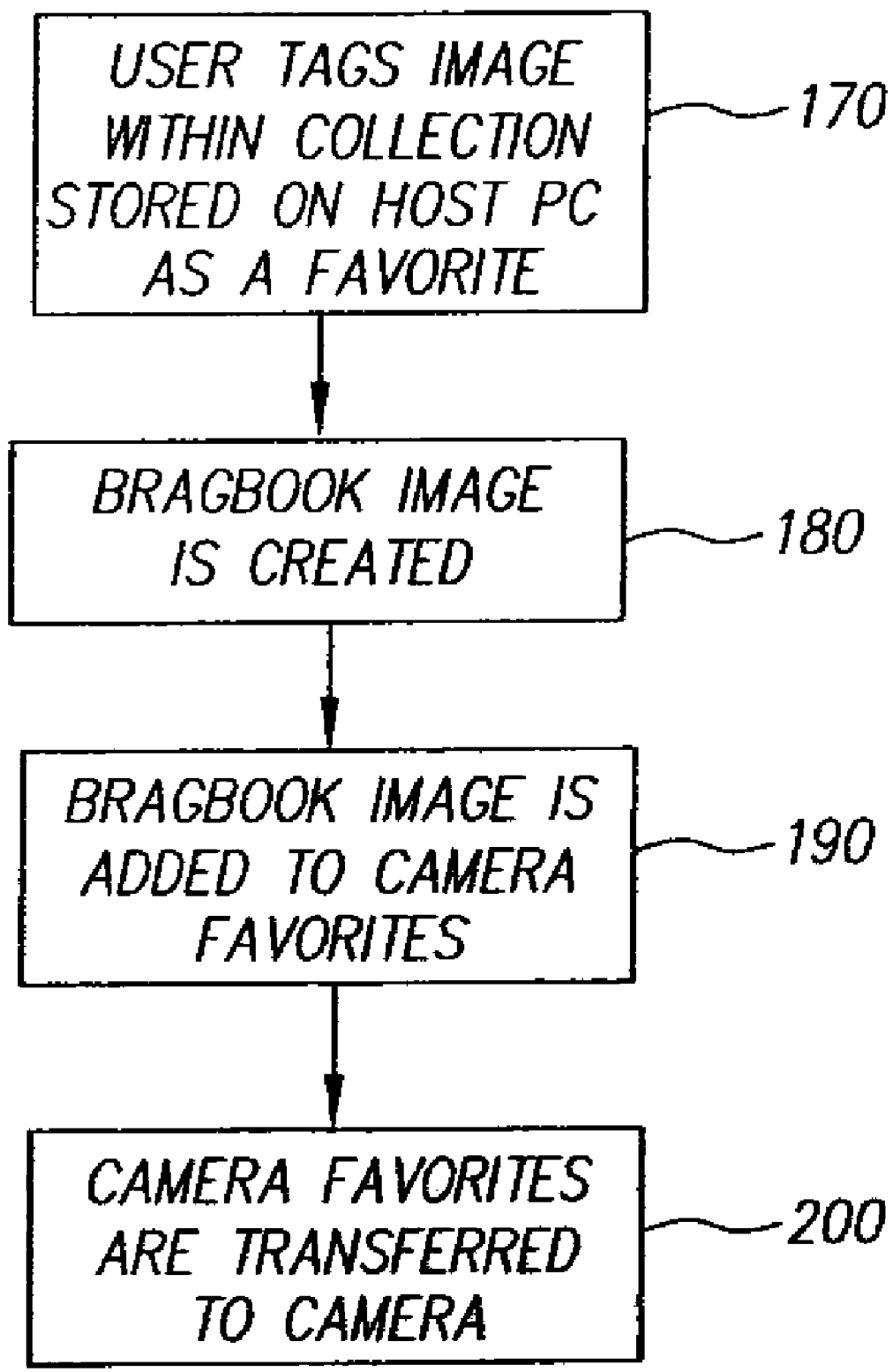
FIG. 3 is a flow chart illustrating adding an image stored on a PC to identified restricted memory location in a portable image storage device.

FIG. 3 describes an alternate process according to the present invention where users may add images stored on the host computer 16 to the Bragbook on the camera 16. The user tags an image or images that have been stored on or transferred to the host computer 16 and have been identified by the user as a favorite for placement in the Bragbook Collection. Software on the computer 16 then creates a Bragbook resolution image of the just tagged picture 180 and stores it in the Bragbook collection on computer 12 associated with a camera 16 in accordance with the preset rules. The Bragbook collection is transferred to the camera 200 at the next communication link with the camera 16. Each Bragbook image on camera 16 will have a copy of it stored on the PC at its camera resolution or highest resolution available.

The Bragbook collection of images are stored in the internal memory of the digital camera 16 in one embodiment. Internal camera storage is memory available within a digital camera without the addition of a memory card such as a Secure Digital Flash Memory card. For example, if the internal memory available amounted to 256 MB and 50% of it were allocated for Bragbook images, then 128 MB of the internal memory could be used to store Bragbook images. The percent of memory allocated for Bragbook images may be a user preference setting within the software on the camera 16 or the settings provided by the software on host computer 12. If the actual Bragbook amount of memory that is used for the storage of images in the Bragbook is less than the allocated amount of memory for the Bragbook, the unused memory may be used to store new images captured by camera 16.

Figure 4:
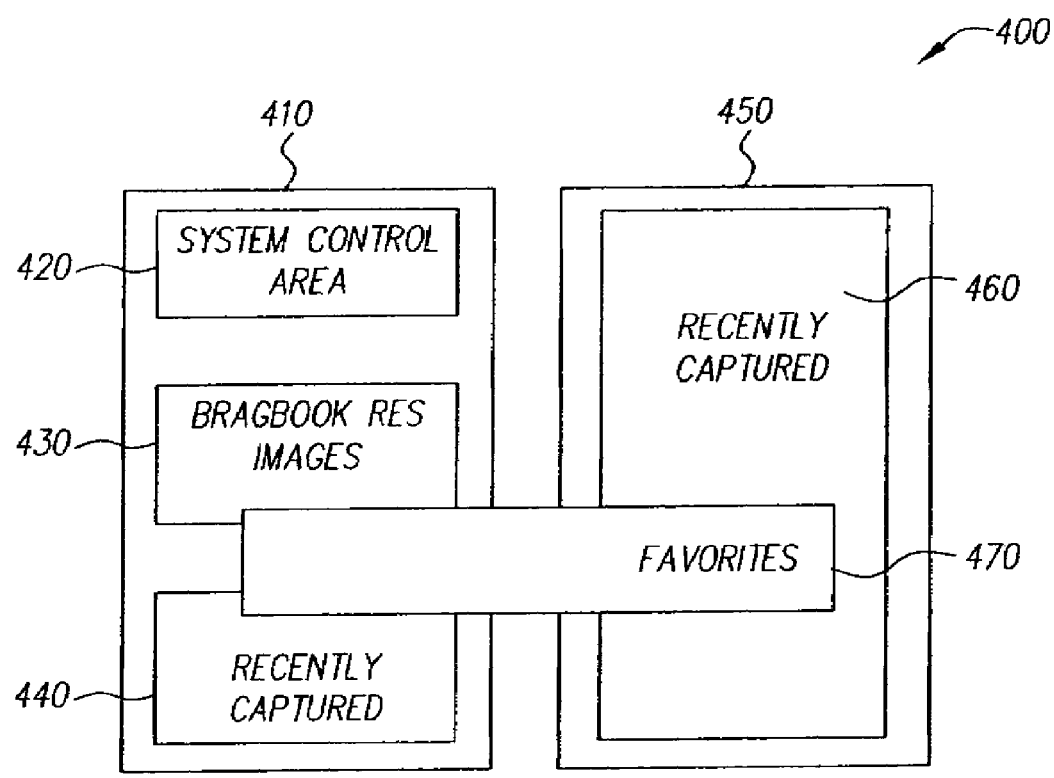
FIG. 4 is a diagram illustrating the physical layout of memory within a camera according to one embodiment of the present invention illustrating the identified restricted memory location in the camera.

Referring to FIG. 4 there is illustrated a memory map of the camera 16. The memory map includes internal memory 410 and SD card memory 450. The system control area 420 is reserved for system software and data. Internal memory has a designated restricted internal memory location/area 430 specifically designed to store the Bragbook resolution images. Memory location/area 430 is restricted in that stored images cannot be deleted or over-written by the camera 12 until the user takes some direct action to override this protection mode. For example, by using the control interface of the camera to override this restriction. As can be seen, the internal memory area 430 is a subset of the internal memory 410. The internal memory 410 also includes a recently captured memory location/area 440 that is used to store images that are captured by the camera 16 at the camera resolution. The recently captured memory location/area 460 is also a subset of the memory card storage 450 that is also used to store images that are captured by the camera 16 at the camera resolution. The favorites block 470 is used to illustrate the images that have been tagged as favorites by the user.

In a preferred embodiment of the present invention, a user may free up the memory in the restricted memory allocated for Bragbook images temporarily, in order to use this memory in internal memory location 430 to store additional images that are captured at the camera resolution. As previously discussed, this requires some direct action of the user. This allows the user to take more pictures without requiring an additional memory card or to transfer the images to PC storage and then deleting them from camera storage. The next time the user transfers the camera images to PC storage, the Bragbook stored in camera 16 will then be restored in the restricted internal memory 430. The images in the Bragbook can be organized in several ways including descriptive tags associated with the images and also by placing them in separate albums.

Figure 5:
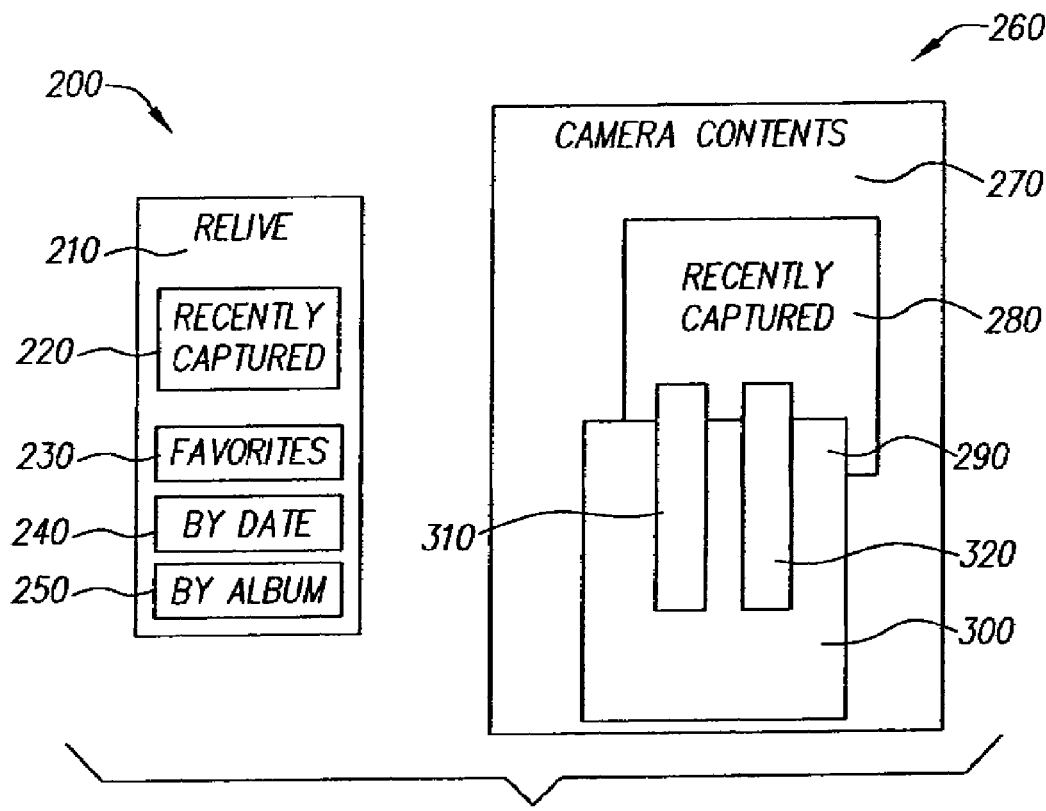
FIG. 5 is a diagram illustrating the user views available from a camera according to one embodiment of the present invention.

FIG. 5 illustrates the various ways a user may access or view all the images stored on camera 16 including those stored in the Bragbook. The Relive/Display block 210 includes various selections for viewing of images on camera 16. These selections can be made by appropriate interface controls on the camera 16, for example, but not limited to selection buttons and switches. In the embodiment illustrated the Relive/Display block 210 includes selections of recently captured images 220, favorites images 230 stored in internal memory location 430 or recently captured digital images that have been tagged by camera 16 as favorites for the Bragbook, images associated by date 240, and images grouped by album 250. A user, by selecting one of these viewing options may access images with various storage structures and attributes 260. The recently captured images 280 are camera resolution captured images stored in the camera either in internal memory 440 or external memory 460 on removable memory card 450. A recently captured image 280 and a Bragbook image 270 may be tagged as a favorite 290. Viewing favorites means that the user may be viewing a combination of Bragbook resolution stored in internal memory location 430 and images having full camera resolution images stored in memory location 440 and/or memory location 460 at the same time. Albums 320 may include recently captured images and stored Bragbook images and favorite images. All images stored on the camera may be tagged with a date attribute 310. The Bragbook images can be annotated with text captions and with audio clips. These images can be viewed individually or played back in a slideshow presentation on camera 16. The Bragbook images may also be modified via several image enhancement methods. Organizing and annotating the Bragbook may be accomplished via camera/device controls and/or via software on computer 16.

The user at some point in time will create a communication link between camera 16 and host computer 12. During this communication link a synchronization event will automatically occur wherein the image tagged as favorites in computer 12 are synchronized with the newly tagged images in camera 16, the images stored in internal memory 430 and the images in computer 12. After synchronization event, images in the Bragbook on computer 12 will be identical to the Bragbook on camera 16, including providing the newly tagged favorite image in the designated resolution for the Bragbooks. In addition to soft display, the images may be shared via email or sent to a printer to produce prints. If printing is accomplished via host software, the camera resolution original version of the image will be used to produce the highest quality print possible. The host software will maintain a database linking Bragbook images to their original image files. The Bragbook images may be transferred as a set for archive/backup purposes, or to publish on a CD or web site.

There are several ways to build a Bragbook set of images/videos which include a manual mode, an automatic keep favorites mode, and an automatic keep everything mode. In manual mode, the user manually places or removes images/videos in the Bragbook collection on computer 16. This is typically supported by host software on computer 16, however, cameras may also enable this capability. During a camera 16 and host software on computer 16 image transfer event, the Bragbook collection on the host PC and camera 16 are updated to be identical as previously discussed. In manual mode, the order of the images/videos in the Bragbook may be preserved. Images/videos may be added to the Bragbook collection on computer 12 or camera 16 until the amount of memory allocated to Bragbook images on camera has been exceeded. Albums or groups of images may also be added to a Bragbook collection. In systems were the user may add images/videos independently to the camera 16 and host software Bragbook collections, the sync operation will keep the more recently captured images/videos by date so not to exceed the available allocated memory. In some implementations, manually placed images/videos in the Bragbook will be tagged as favorites and as protected. To be deleted, a protected image must first be unprotected by a user. Protected and favorite images have priority over non-protected favorite images for inclusion in the Bragbook. In the automatic keep favorites mode, all images that are tagged as favorites will be placed in the Bragbook until the amount of memory allocated for Bragbook images has been exceed. If an album is tagged as a favorite, then all of the images and videos within this album will be considered as favorites and be added to the Bragbook. In some implementations, a more recent favorite by capture date replaces the oldest favorite when the Bragbook memory allocation is full. Another implementation may replace the oldest favorite, which is not protected. In the automatic keep everything mode, all images stored in the host collection will be placed in the Bragbook until the amount of memory allocated for Bragbook images has been exceeded. As in the other modes, several strategies may be employed when adding new images when the Bragbook memory allocation has been exceeded. If a user switches between manual and automatic modes, the Bragbook set of images at the transition will be the initial Bragbook for the new operating mode. In the automatic modes, an image transfer event from the camera to the host software would result in an updated and synchronized Bragbook collection. Only new images need to be transferred and not the entire camera image collection and the newly updated Bragbook collection.

The Bragbook collection that is stored on a device (camera 16, phone cam 20, PDA 22, viewer, etc.) after synchronization with host software will be an exact copy of the Bragbook collection stored on the PC at that point in time. Typically these Bragbook collections would be uniquely named using the model number and name of the device on which a copy of the Bragbook will be stored. The unique named (identification) of the Bragbook collection stored on the PC may be referred to as the preferred or controlling Bragbook collection for the corresponding device that will have copies thereof. That is, if there is a difference in the Bragbook on computer 12 with the Bragbook on the synchronizing device, the BragBook on the computer will control which images that are to be deleted from the various Bragbook collection and in accordance with any rules set by the user. Any of the linking device may add images to the Bragbook collection, but only the controlling computer or other device may delete images.

Printing of images in any of the Bragbooks may occur by downloading the images from the device to printer or service provider over communication network 14. This will result in the printing of the image with the resolution currently found in the Bragbook. Alternatively, the images may be identified as having corresponding higher resolution at the controlling Bragbook, such as on the computer 12. Therefore if the camera 16, or other associated device, sends or creates a print order for fulfillment by a service provider, information associated with selected image may identify the higher stored image and stored location, including its electronic address/identification of where the higher resolution image is stored, such as the host computer 12. Then the service provider can access or request access from computer 12 to obtain the higher resolution image for printing. The obtainment of the high resolution image at the host computer 12 would of course also be in accordance within the rules set up at the host computer 12.

While in the above embodiment the computer 12 is described as the controlling database of the Bragbook upon which the other associated device rely as the controlling source, any of the various associated devices may be identified as the controlling source/data base upon which the other device will rely on as controlling what stays in the Bragbook. It is also to he understood that more then one Bragbook may be identified in any one device and that images in each Bragbook my be further subdivided into album and specific images that are to be shared with rules for that particular image and/or album. While the camera embodiment describes new images designated for placement in the restricted internal memory are obtained by the camera, these images may be obtained using any device or systems. For, example new obtained images may be obtained over the internet or other communication network or directly to the device by other associated or non-associated devices. These obtained images would then be flagged as a favorite by the receiving device and upon communication link with any associated device or controlling data base, appropriate exchanges of images will occur in accordance with the pre-set rules.

The Bragbook in another embodiment can be used as a convenient source for sharing images, albums, and/or the entire Bragbook. In these cases, several devices of friends and family would have their own personal Bragbooks. An image, album, or the entire Bragbook can be shared directly between devices via wired or wireless data transfer between the devices. The Bragbook images would be automatically stored in the destination device's Bragbook area. In this case there would be no need to resize the images to Bragbook resolution or to wait for a communication link to the host controlling database of Bragbook images. The destination device would only have to accept the received images and in a future communication link to the controlling database, the received images would be part of the controlling database.

While the present invention has been described primarily with reference to images, the present invention is not so limited, the term images may also include video and/or sound which may be stored in the Bragbooks.

The invention has been described in detail with particular reference to certain preferred embodiments thereof, but it will be understood that variations and modifications can be effected within the spirit and scope of the invention.

PARTS LIST

10 system
12 computer
14 communication network
16 digital camera
18 portable PC
20 phone cam
22 personal digital assistant (PDA)
24 service provider
100 Step
110 Step
120 Step
130 Step
140 Step
180 picture
200 camera
210 relive/display block
230 favorite images
240 date
250 album
260 attributes
270 BragBook image
280 images
290 favorite
310 date attribute 320 album
410 internal memory
420 control area
430 memory location/area
440 memory location/area
450 card memory
460 memory location/area
470 favorites block

What is claimed is:

1. A system for managing digital images that have been designated for placement in an identified designated collection, comprising:
a computer capable of communicating with said digital display and storage device, said computer having said database containing digital images that have been designated for placement in an identified collection thereon, that allows for restoration of said digital images in said second memory section;
at least one digital display and storage device having memory for storing of digital images, said memory having a first section designated for storing digital images that have been obtained by said digital display and storage device and a second memory section for storing digital images that correspond to said images in said identified designated collection on said computer, said second memory section having a protected mode that prevents said digital images in said second memory section from being deleted until the user of said digital display and storage device disables the protected mode, when said protected mode of said second section is disabled then said digital display and storage device can overwrite said digital images in said second memory section with newly obtained digital images, said second memory being restored to correspond to said digital images in said identified collection on said computer when said display and storage device is in a communication link with a database after said newly obtained digital images in said second memory have been removed.

2. A system according to claim 1 wherein said digital images in said second memory section are overwritten only to the extent necessary to store said newly obtained digital images.

3. A system according to claim 1 wherein said digital images in said second memory section will not be written over until said first memory section can no longer store obtained digital images.

4. A system according to claim 1 wherein removal of said newly obtained digital images comprises uploading of said newly obtained images to said database.

5. A system according to claim 1 wherein said at least one display and storage device comprises a plurality of display and storage devices.

6. A system according to claim 5 where each of said second memory sections each of said plurality of display and storage devices are designed to have the same digital images 7. A system according to claim 1 wherein said display and storage device comprises a digital camera.

8. A system according to claim 1 wherein said display and storage device comprises a PDA.

9. A system according to claim 1 wherein said display and storage device comprises a portable computer.

10. A system according to claim 1 wherein said display and storage device comprises a phone cam.

11. A system according to claim 1 wherein said computer is located at a service provider that is accessible over a communication network.

12. A software product for use in controlling a digital display and storage device, said digital display and storage device having a memory for storing of digital images and communication capabilities for communicating with other devices and a computer program when loaded on said digital display and storage device will cause the display and storage device to perform the steps of:
allowing storage of obtained digital images in a first memory section of said memory;
allowing storage of designated digital images in a second memory section of said memory, said second memory section having a protected mode that prevents said digital images in said second memory section from being deleted;
allowing a user of said digital display and storage device to disable the protected mode such that when said protected mode of said second memory section is disabled said digital display and storage device can overwrite said digital images in said second memory section with said newly obtained digital images; and
restoring of said digital images in said second memory section that were overwritten to said second memory section when said camera is in communication with a database that has information for restoring said digital images that have been overwritten.

13. A software product according to claim 12 wherein said restoring of said overwritten images in said second memory section is done after said newly obtained images in said second memory have been uploaded to said database.

14. A software program such that when said software program is loaded onto a computer, it will cause the computer to perform the steps of:
control the storage of digital images in a designated collection in said computer and a corresponding collection in at least one digital display and storage device, said digital display and storage device having memory for storing of digital images and communication capabilities for communicating with said computer, said memory having a first section for storage of digital images obtained by said display and storage device and a second memory section for long term storage of designated digital images, said program controlling what digital images are placed in said second memory section of said at least one display and storage device, said at least one display and storage device having a protected mode that prevents said digital images in said second memory section from being deleted, and allows a user of said digital display and storage device to disable the protected mode such that when said protected mode of said second memory section is disabled said digital display and storage device will overwrite said digital images in said second memory section with said obtained digital images; and
restoring of said digital images in said designated collection in second memory section that were overwritten when said display and storage device is in communication with computer.

15. A method for maintaining a designated collection of digital images among a plurality of associated devices, comprising the steps of:
a. maintaining a control designation collection of digital images in a first device for controlling what is maintained in said control designation collection and at a designated resolution which is equal to or less than the highest resolution of said image obtained by said first device, said first device having the ability to add and/or delete digital images from said control designation collection, said first device capable of establishing a communication link with at least one associated display and storage device and controlling a corresponding collection of digital images at a second designated resolution in said at least one display and storage device that corresponds to said control designation collection, each of said at least one associated storage and display device having the ability to obtain digital images and identifying if the newly obtained images are to be added to said control designation collection, said corresponding collection of digital images is located in a protected memory location that can only be overwritten by a specific action taken by a user of said at least one digital display and storage device;

b. establishing a communication link between said first device and said at least one display and storage device; and c. automatically updating said control designation collection in said first device when said first device is in communication link with said at least one associated device and updating said corresponding collection on said at least one associated storage and display device.

16. A system for managing digital images that have been designated for placement in an identified designated collection, comprising:

a computer capable of communicating with said digital camera, said computer having said database containing digital images that have been designated for placement in an identified collection thereon, that allows for restoration of said digital images in said second memory section.

at least one digital camera having memory for storing of digital images, said memory having a first section designated for storing digital images that have been obtained by said digital camera and a second memory section for storing digital images that correspond to said images in said identified designated collection on said computer, said second memory section having a protected mode that prevents said digital images in said second memory section from being deleted until the user of said digital camera disables the protected mode, when said protected mode of said second section is disabled then said digital camera can overwrite said digital images in said second memory section with newly obtained digital images, said second memory being restored to correspond to said digital images in said identified collection on said computer when said camera is in a communication link with a database after said newly obtained digital images in said second memory have been removed.

17. A system according to claim 16 wherein said digital images in said second memory section are overwritten only to the extent necessary to store said newly obtained digital images.

18. A system according to claim 16 wherein said digital images in said second memory section will not be written over until said first memory section can no longer store obtained digital images.

19. A system according to claim 16 wherein removal of said newly obtained digital images comprises uploading of said newly captured images to said database.

20. A system according to claim 16 wherein said at least one camera comprises a plurality of cameras.

21. A system according to claim 20 wherein each of said second memory sections of said plurality of cameras are designed to have the same digital images.

22. A system according to claim 16 wherein said computer is located at a service provider that is accessible over a communication network.

23. A software product for use in controlling a digital camera, said digital camera having a memory for storing of digital images and communication capabilities for communicating with other devices and a computer program when loaded on said digital camera will cause the camera to perform the steps of:

allowing storage of captured digital images in a first memory section of said memory;

allowing storage of designated digital images in a second memory section of said memory, said second memory section having a protected mode that prevents said digital images in said second memory section from being deleted;

allowing a user of said digital camera to disable the protected mode such that when said protected mode of said second memory section is disabled said digital camera can overwrite said digital images in said second memory section with said newly obtained digital images; and restoring of said digital images in said second memory section that were overwritten to said second memory section when said camera is in communication with a database that has information for restoring said digital images that have been overwritten.

24. A software product according to claim 23 wherein said restoring of said overwritten images in said second memory section is done after said newly captured images in said second memory have been uploaded to said database:

25. A software program such that when said software program is loaded onto a computer, it will cause the computer to perform the steps of:

control the storage of digital images in a designated collection in said computer and a corresponding collection in at least one digital camera, said digital camera having memory for storing of digital images and communication capabilities for communicating with said computer, said memory having a first section for storage of digital images obtained by said camera and a second memory section for long term storage of designated digital images, said program controlling what digital images are placed in said second memory section of said at least one camera, said at least one camera having a protected mode that prevents said digital images in said second memory section from being deleted, and allows a user of said digital camera to disable the protected mode such that when said protected mode of said second memory section is disabled said digital camera will overwrite said digital images in said second memory section with said obtained digital images; and restoring of said digital images in said designated collection in second memory section that were overwritten when said camera is in communication with computer.

26. A method for maintaining a designated collection of digital images among a plurality of devices comprising the steps of:

a. maintaining a control designation collection of digital images in a first device for controlling what is maintained in said designated collection and at a designated resolution which is equal to or less than the highest resolution of said image obtained by said first device, said first device having the ability to add and/or delete digital images from said control designation collection, said first device capable of establishing a communication link with at least one camera and controlling a corresponding collection of digital images at said designated resolution in said at least one camera such that corresponds to said designated collection, each of said at least one storage and display device having the ability to obtain digital images and identifying if the newly obtained images are to be added to said control designated collection, said corresponding collection is located in a protected memory location that can only be overwritten by a specific action taken by a user of said at least one digital camera;

b. establishing a communication link between said first device and said at least one camera; and c. automatically updating said control designated collection in said first device when said first device is in communication link with said at least one device and updating said corresponding collection on said at least one storage and display device.

27. A method for maintaining a designated collection of digital images among a plurality of associated devices and for ordering image products, comprising the steps of:

a. maintaining a control designation collection of digital images in a first device for controlling what is maintained in said control designation collection and at a designated resolution which is equal to or less than the highest resolution of said image obtained by said first device, said first device having the ability to add and/or delete digital images from said control designation collection, said first device capable of establishing a communication link with at least one associated display and storage device and controlling a corresponding collection of digital images at a second designated resolution in said at least one display and storage device that corresponds to said control designation collection, each of said at least one storage and display device having the ability to obtain digital images and identifying if the newly obtained images are to be added to said control designated collection, said corresponding collection is located in a protected memory location that can only be overwritten by a specific action taken by a user of said at least one digital display and storage device, said device having selection inputs for ordering of an image product designating one of said digital images in said corresponding collection;

b. establishing a communication link between said first device and said at least one display and storage device; and c. automatically providing said image product wherein the high resolution image of said designated image in said control designation collection in said first device is used to produce said image product.

* * * * *